(12) United States Patent
Nias et al.

(10) Patent No.: US 9,013,834 B2
(45) Date of Patent: Apr. 21, 2015

(54) TOLERANCE RING WITH DISCRETE TOLERANCE RING PANELS

(71) Applicant: Saint-Gobain Performance Plastics Rencol Limited, Coventry (GB)

(72) Inventors: Benjamin Nias, Bristol (GB); Nik S. Woodhead, Bristol (GB); Thomas B. Francis, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 0 days.

(21) Appl. No.: 14/132,878

(22) Filed: Dec. 18, 2013

(65) Prior Publication Data

US 2014/0185164 A1 Jul. 3, 2014

Related U.S. Application Data

(60) Provisional application No. 61/747,959, filed on Dec. 31, 2012.

(51) Int. Cl.
| | |
|---|---|
| G11B 5/55 | (2006.01) |
| G11B 21/08 | (2006.01) |
| G11B 5/48 | (2006.01) |
| F16D 1/08 | (2006.01) |

(52) U.S. Cl.
CPC ............ G11B 5/4813 (2013.01); F16D 1/0829 (2013.01); F16D 1/0835 (2013.01); G11B 5/5569 (2013.01)

(58) Field of Classification Search
USPC ......................... 360/265.2, 265.3, 265.6, 267
See application file for complete search history.

(56) References Cited

U.S. PATENT DOCUMENTS

| | | | |
|---|---|---|---|
| 15,817 | A | 9/1856 | Riley |
| 1,416,246 | A | 5/1922 | Turck |
| 2,675,283 | A | 4/1954 | Thomson |
| 3,972,576 | A | 8/1976 | Hill |
| 4,382,598 | A | 5/1983 | McCloud |
| 4,569,614 | A | 2/1986 | Yamauchi |
| RE32,764 | E | 10/1988 | Smith et al. |
| 5,072,880 | A | 12/1991 | McCloud |
| 5,727,885 | A | 3/1998 | Ono et al. |
| 7,703,432 | B2 | 4/2010 | Shaffer |
| 2007/0096572 | A1 | 5/2007 | Watkins et al. |
| 2009/0028482 | A1 | 1/2009 | Iwata et al. |
| 2012/0087044 | A1* | 4/2012 | Schmidt et al. ............ 360/265.6 |

FOREIGN PATENT DOCUMENTS

| | | |
|---|---|---|
| DE | 102011015199 A1 | 9/2012 |
| EP | 1759955 A2 | 3/2007 |
| EP | 1961979 A2 | 8/2008 |

OTHER PUBLICATIONS

International Search Report for PCT Application No. PCT/EP2013/077153, dated Jul. 28, 2014, Applicant's Ref. No. 19170P-WO.

* cited by examiner

*Primary Examiner* — Joseph Feild
*Assistant Examiner* — Gustavo Polo
(74) *Attorney, Agent, or Firm* — Chi Kim Suk; Abel Law Group, LLP (57) ABSTRACT

A tolerance ring for a hard disc drive assembly is disclosed and can include a plurality of discrete tolerance ring panels. Each tolerance ring panel can include an arcuate sidewall that can include an unformed portion and at least one projection extending from the arcuate sidewall. The projection can be surrounded by the unformed portion of the arcuate sidewall and the tolerance ring can be configured to be deployed in an interference fit between an inner component and an outer component to provide torque coupling between an inner component and an outer component.

20 Claims, 8 Drawing Sheets

TOLERANCE RING WITH DISCRETE TOLERANCE RING PANELS

CROSS-REFERENCE TO RELATED APPLICATION

The present application claims priority from U.S. Provisional Patent Application No. 61/747,959, filed Dec. 31, 2012, entitled "TOLERANCE RING WITH DISCRETE TOLERANCE RING PANELS", naming as inventors Benjamin Nias, Nik S. Woodhead and Thomas B. Francis, which application is incorporated by reference herein in its entirety.

FIELD OF THE DISCLOSURE

The present disclosure is directed generally to tolerance rings, and particularly to tolerance rings for actuator arms within hard disk drives.

DESCRIPTION OF THE RELATED ART

The present disclosure relates to tolerance ring assemblies, wherein a tolerance ring provides an interference fit between parts of an assembly, in which a first part has a cylindrical portion located in a cylindrical bore of a second part. In particular, the present disclosure relates to assemblies having a tolerance ring that provides an interference fit between a cylindrical component such as a shaft or a bearing and a housing for the shaft.

Improved engineering techniques have resulted in the need for greater accuracy of machine parts, raising manufacturing costs. Very close tolerances are required where press fits, splines, pins or keyways are employed to transmit torque in applications such as pulleys, flywheels or driveshafts.

Tolerance rings may be used to provide an interference fit between parts required to transmit torque. Tolerance rings provide a low cost means of providing an interference fit between parts that may not be machined to exact dimensions. Tolerance rings have a number of other potential advantages, such as compensating for different linear coefficients of expansion between the parts, allowing rapid apparatus assembly, and durability.

A tolerance ring generally comprises a strip of resilient material, for example a metal such as spring steel, the ends of which are brought together to form a ring. A band of protrusions extend radially outwards from the ring, or radially inwards towards the center of the ring. Usually, the protrusions are formations, possibly regular formations, such as corrugations, ridges or waves.

When the ring is located in the annular space between, for example, a shaft and a bore in a housing in which the shaft is located, the protrusions are compressed. Each protrusion acts as a spring and exerts a radial force against the shaft and the surface of the bore, providing an interference fit between the shaft and the housing. Rotation of the housing or the shaft will produce similar rotation in the other of the shaft or the housing, as torque is transmitted by the tolerance ring. Typically, the band of protrusions is axially flanked by annular regions of the ring that have no formations (known in the art as "unformed regions" of the tolerance ring).

Although tolerance rings usually comprise a strip of resilient material that is curved to allow the easy formation of a ring by overlapping the ends of the strip, a tolerance ring may also be manufactured as an annular band. The term "tolerance ring" as used hereafter includes both types of tolerance ring.

The term "shaft" as used hereafter includes any assembly component with a cylindrical portion, such as a shaft or a bearing.

Accordingly, the industry continues to need improvements in tolerance rings, particularly tolerance rings installed within hard disk drives.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to tolerance rings, and particularly, to tolerance rings that can be installed within a hard disk drive between a pivot assembly and a bore formed in an actuator arm. In one aspect, a tolerance ring can be fitted around the pivot assembly and then this assembly can be inserted into the bore. Alternatively, the tolerance ring can be inserted into the bore and the pivot can be inserted into the tolerance ring.

In a typical tolerance ring, the waves nearest to the gap tend to be the weakest, i.e., least stiff, since the waves have a gap on one side and material on the other and the remaining waves in the tolerance ring are flanked by material on both sides. This variation in stiffness can cause performance variables, e.g., resonance and alignment, to be very dependent on a position of the gap in the hard disk drive assembly. Attempting to optimize the gap location for one performance parameter can adversely affect other performance parameters. This, in turn, can compromise overall performance.

A tolerance ring according to one or more of the embodiments described herein can include a plurality discrete tolerance ring panels that can be equally spaced around the circumference of the tolerance ring and the tolerance ring can be symmetric about an axis passing through the center of the tolerance ring and a gap in the tolerance ring.

The arrangement provided by the tolerance ring panels disclosed herein can provide a tolerance ring having a resonant frequency and stiffness that do not substantially vary circumferentially around the tolerance ring. As such, the tolerance ring can maintain the pivot assembly in alignment within the bore and can substantially prevent any rocking of the post within the bore under normal operational loads in nearly any radial direction.

Figure 1:
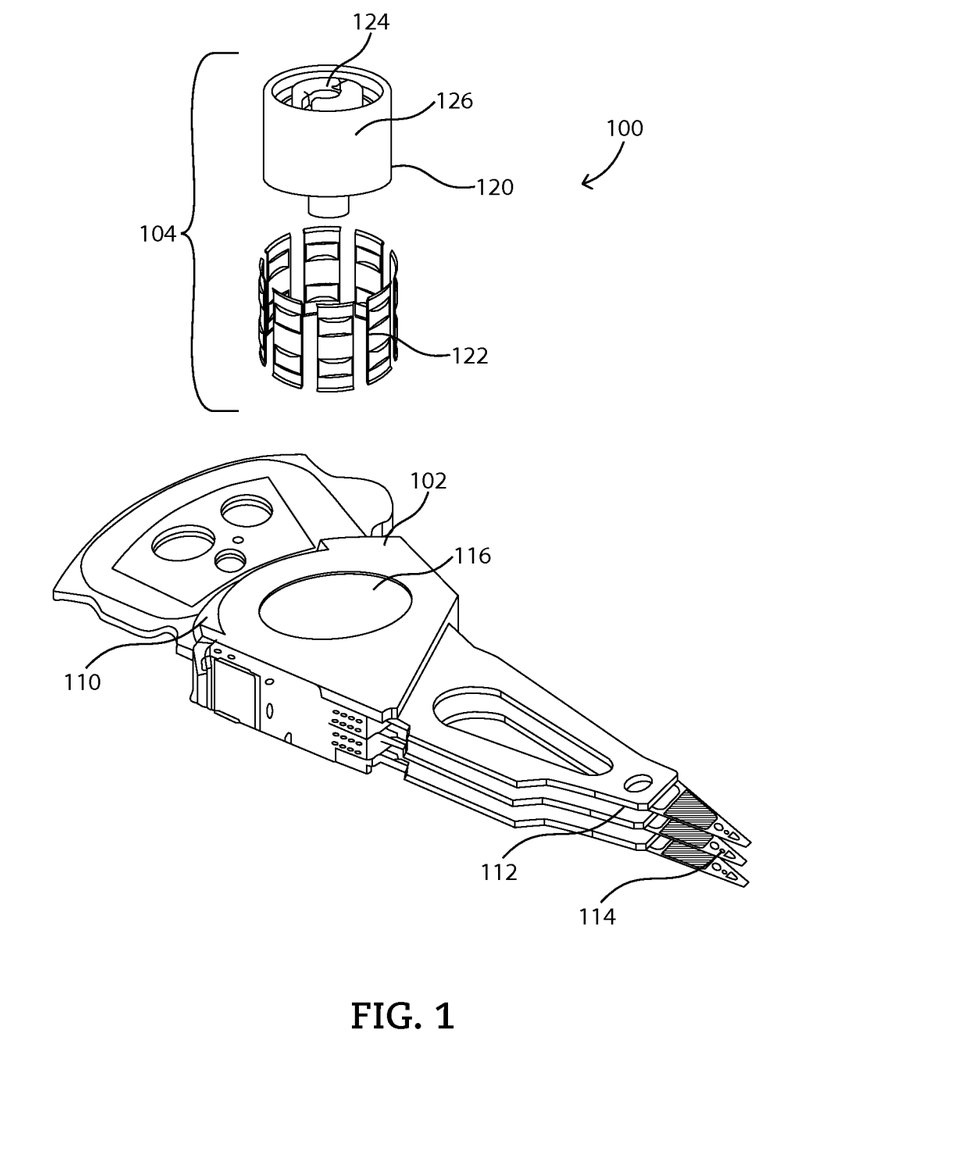
FIG. 1 includes an exploded perspective view of a hard disk drive assembly in accordance with an embodiment.

Referring initially to FIG. 1, a hard disk drive assembly is shown and is generally designated 100. The hard disk drive assembly 100 can include an actuator arm 102 for a hard disk drive and a pivot assembly 104.

As illustrated, the actuator arm 102 can include a proximal end 110 and a distal end 112. A plurality of read/write heads 114 can extend from the distal end 112 of the actuator arm 102. Moreover, the actuator arm 102 can be formed with a bore 116 near the proximal end 110 of the actuator arm 102.

FIG. 1 further indicates that the pivot assembly 104 can include a pivot 120 and a tolerance ring 122. The pivot 120 can include an inner member 124 and an outer member 126, and the outer member 126 can rotate with respect to the inner member 124.

In a particular aspect, the tolerance ring 122 can fit around the pivot 120 and then, the pivot assembly 104 can be installed within the bore 116. In another aspect, the tolerance ring 122 can be placed within the bore 116 and the pivot 120 can be inserted into the tolerance ring 122. The tolerance ring 122 can establish an interference fit between the outer member 126 of the pivot 120 and the bore 116 of the actuator arm 102. As such, the actuator arm 102 can rotate with the outer member 126 of the pivot 120 around the inner member 124 of the pivot 120.

Figure 2:
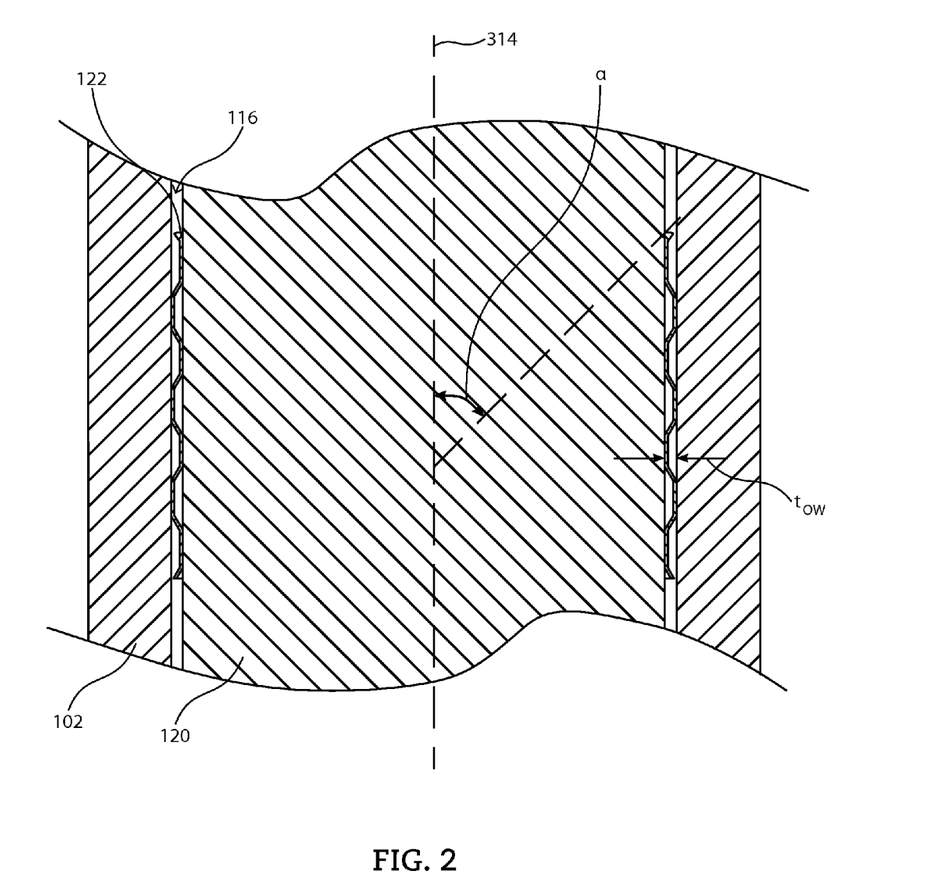
FIG. 2 includes a cross-sectional view of a hard disk drive assembly in accordance with an embodiment.

Accordingly, as shown in FIG. 2, the tolerance ring 122 can be installed within the bore 116 between an outer component, the actuator arm 102, and an inner component, the pivot 120. In a particular aspect, when installed, no portion of the tolerance ring 122 extends beyond the top or bottom of the bore and the tolerance ring 122 can be completely contained within the bore 116. In another aspect, a portion of the tolerance ring 122, e.g., a top, a bottom, a structure on a top, a structure on a bottom, or a combination thereof, can extend from the bore.

As illustrated in FIG. 2, and described in greater detail below, the tolerance ring 122 can be configured to engage the inner wall of the bore 116 and the outer wall of the pivot 120 in order to maintain the pivot 120 within the actuator arm 102 in an interference fit. The tolerance ring 122 can account for dimensional variations by expanding around the pivot 120 as it is installed thereon and then, at least partially deforming, or compressing, within the bore 116 during installation.

Figure 3:
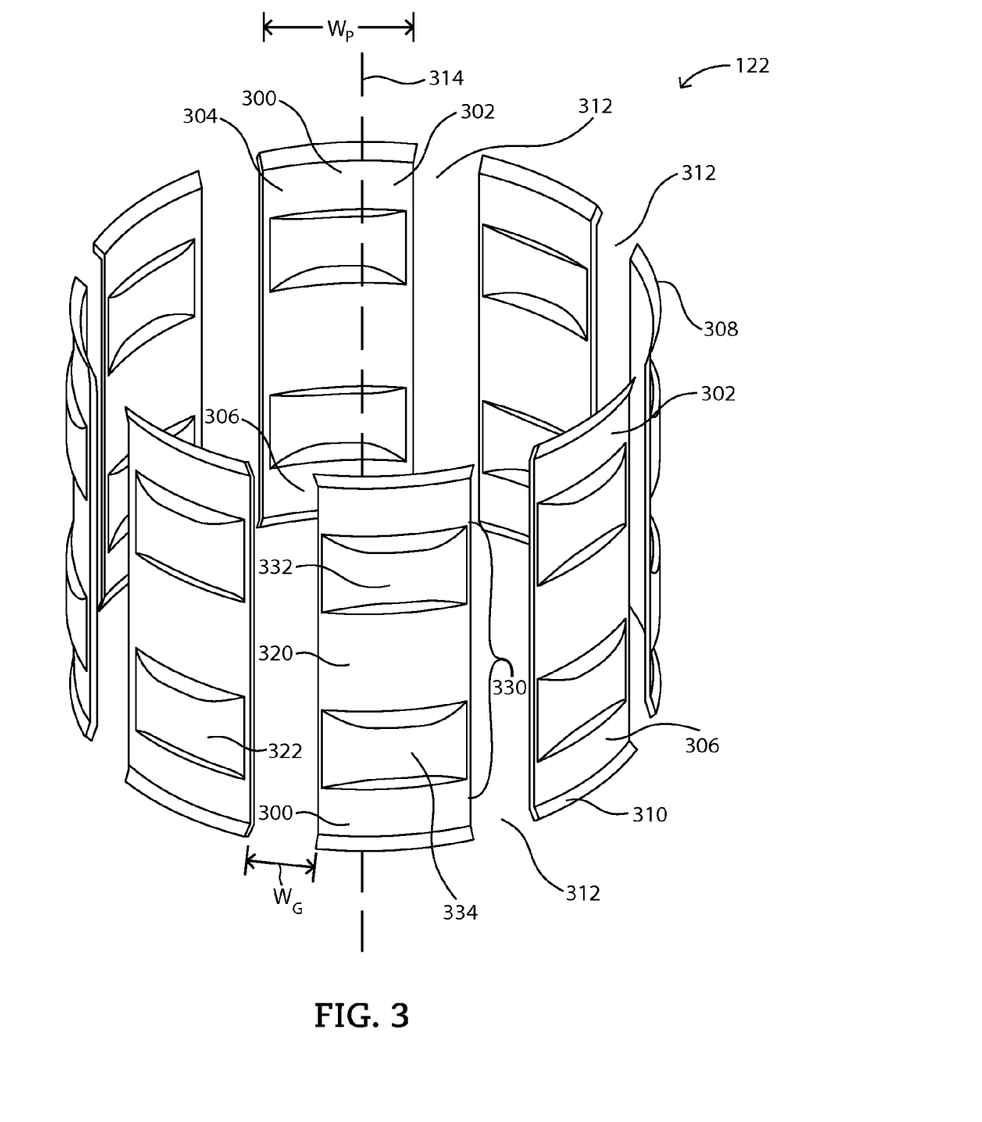
FIG. 3 includes a perspective view of a tolerance ring in accordance with an embodiment.

Referring now to FIG. 3, details concerning the tolerance ring 122 are illustrated. As stated above, the tolerance ring 122 is configured to be deployed in an interference fit between an inner component and an outer component to provide torque coupling between an inner component and an outer component. The inner component can be the pivot assembly, described above, and the outer component can be the actuator arm for the hard disk drive assembly, also described above.

As depicted, the tolerance ring 122 can include a plurality of discrete tolerance ring panels 300. Each tolerance ring panel 300 can include an arcuate sidewall 302 having a top 304 and a bottom 306. In FIG. 3, the arcuate sidewall 302 of each tolerance ring panel 300 can also include an upper flange portion 308 that can extend from the top 304 of the arcuate sidewall 302 and a lower flange portion 310 that can extend from the bottom 306 of the arcuate sidewall 302.

In a particular aspect, the tolerance ring panels 300 are spaced apart circumferentially to form a plurality of gaps 312 within the tolerance ring 122. Each gap 312 can include a circumferential width, $W_G$, and $W_G$ is uniform around the tolerance ring 122. Alternatively, $W_G$ can vary around the tolerance ring 122. In another aspect, each tolerance ring panel 300 can have a circumferential width, $W_P$. $W_P$ can be uniform around the tolerance ring. In another aspect, $W_P$ can vary around the tolerance ring.

In another aspect, $W_G$ can be ≤400% $W_P$, such as ≤300% $W_P$, ≤200% $W_P$, ≤100% $W_P$, or ≤50% $W_P$. Further, $W_G$ can be ≥1% $W_P$, such as ≥5% $W_P$, or ≥10% $W_P$. In another aspect, $W_G$ can be within a range between and including any of the values of $W_G$ described herein. For example, $W_G$ can be ≤400% $W_P$ and ≥1% $W_P$, such as ≤400% $W_P$ and ≥5% $W_P$, ≤400% $W_P$ and or ≥10% $W_P$. $W_G$ can be ≤300% $W_P$ and ≥1% $W_P$, such as ≤300% $W_P$ and ≥5% $W_P$, ≤300% $W_P$ and or ≥10% $W_P$. Further, $W_G$ can be ≤200% $W_P$ and ≥1% $W_P$, such as ≤200% $W_P$ and ≥5% $W_P$, ≤200% $W_P$ and or ≥10% $W_P$. Still further, $W_G$ can be ≤150% $W_P$ and ≥1% $W_P$, such as ≤150% $W_P$ and ≥5% $W_P$, ≤150% $W_P$ and or ≥10% $W_P$. Even further, $W_G$ can be ≤100% $W_P$ and ≥1% $W_P$, such as ≤100% $W_P$ and ≥5% $W_P$, ≤100% $W_P$ and or ≥10% $W_P$.

In a particular embodiment, the tolerance ring 122 can include at least two discrete tolerance ring panels 300, such as at least three discrete tolerance ring panels 300, at least four discrete tolerance ring panels 300, at least five discrete tolerance ring panels 300, at least six discrete tolerance ring panels 300, or at least eight discrete tolerance ring panels 300. Moreover, the tolerance ring 122 may include no more than twenty discrete tolerance ring panels 300. Further, the tolerance ring 122 may include between and including two and twenty discrete tolerance ring panels 300, such as between and including three and twenty discrete tolerance ring panels 300, between and including four and twenty discrete tolerance ring panels 300, between and including five and twenty discrete tolerance ring panels 300, between and including six and twenty discrete tolerance ring panels 300, or between and including eight and twenty discrete tolerance ring panels 300.

The tolerance ring 122 can include a central axis 314 and as shown in FIG. 2 and FIG. 3, in a particular aspect, the flange portions 308, 310 can be angled in an outward direction with respect to the central axis 314 of the tolerance ring 122. It is to be understood that the flange portions 308, 310 can be angled in an inward direction with respect to the central axis 314. In either case, the flanges portions 308, 310 can form an angle, $\alpha$, with respect the central axis 314. In a particular aspect, $\alpha$ can be ≥5°, such as ≥10°, or ≥15°. In another aspect, $\alpha$ can be ≤30°, such as ≤25°, or ≤20°. In another aspect, $\alpha$ can be within a range between, and including, any of the maximum and minimum values of a disclosed herein.

For example, $\alpha$ can be ≥5° and less than ≤30°, such as ≥5° and ≤25°, or ≥5° and ≤20°. Further, $\alpha$ can be ≥10° and less than ≤30°, such as ≥10° and ≤25°, or ≥10° and ≤20°. Even further, $\alpha$ can be ≥15° and less than ≤30°, such as ≥15° and ≤25°, or ≥15° and ≤20°.

As more clearly illustrated in FIG. 2, the tolerance ring 122 may include an overall wall thickness, $t_{OW}$, that is the distance between the inner surface of the arcuate sidewall 302 of the tolerance ring panel 300 and an outer surface of a wall structure formed in the sidewall 302 of the tolerance ring panel 300. Further, each flange portion 308, 310 can extend from the arcuate sidewall 302 such that each flange portion 308, 310 has an overall flange thickness, $t_{OF}$, that is the distance between the inner surface of the arcuate sidewall 302 of the tolerance ring panel 30 and the outer edge of the flange portion 308, 310. In a particular aspect, $t_{OF}$ can be ≥30% $t_{OW}$, such as ≥35% $t_{OW}$, ≥40% $t_{OW}$, ≥45% $t_{OW}$, ≥50% $t_{OW}$, ≥55% $t_{OW}$, or ≥60% $t_{OW}$. Further, $t_{OF}$ can be ≤98% $t_{OW}$, such as ≤95% $t_{OW}$, ≤90% $t_{OW}$, ≤85% $t_{OW}$, or ≤80% $t_{OW}$. In another aspect, $t_{OF}$ can be within a range between, and including, any of the percentage values of $t_{OW}$ disclosed above.

For example, $t_{OF}$ can be ≥30% $t_{OW}$ and ≤98% $t_{OW}$, such as ≥30% $t_{OW}$ and ≤95% $t_{OW}$, ≥30% $t_{OW}$ and ≤90% $t_{OW}$, ≥30% $t_{OW}$ and ≤85% $t_{OW}$, or ≥30% $t_{OW}$ and ≤80% $t_{OW}$. Further, $t_{OF}$ can be ≥35% $t_{OW}$ and ≤98% $t_{OW}$, such as ≥35% $t_{OW}$ and ≤95% $t_{OW}$, ≥35% $t_{OW}$ and ≤90% $t_{OW}$, ≥35% $t_{OW}$ and ≤85% $t_{OW}$, or ≥35% $t_{OW}$ and ≤80% $t_{OW}$. Moreover, $t_{OF}$ can be ≥40% $t_{OW}$ and ≤98% $t_{OW}$, such as ≥40% $t_{OW}$ and ≤95% $t_{OW}$, ≥40% $t_{OW}$ and ≤90% $t_{OW}$, ≥40% $t_{OW}$ and ≤85% $t_{OW}$, or ≥40% $t_{OW}$ and ≤80% $t_{OW}$. Further still, $t_{OF}$ can be ≥45% $t_{OW}$ and ≤98% $t_{OW}$, such as ≥45% $t_{OW}$ and ≤95% $t_{OW}$, ≥45% $t_{OW}$ and ≤90% $t_{OW}$, ≥45% $t_{OW}$ and ≤85% $t_{OW}$, or ≥45% $t_{OW}$ and ≤80% $t_{OW}$. Even further, $t_{OF}$ can be ≥50% $t_{OW}$ and ≤98% $t_{OW}$, such as ≥50% $t_{OW}$ and ≤95% $t_{OW}$, ≥50% $t_{OW}$ and ≤90% $t_{OW}$, ≥50% $t_{OW}$ and ≤85% $t_{OW}$, or ≥50% $t_{OW}$ and ≤80% $t_{OW}$. In another aspect, $t_{OF}$ can be ≥55% $t_{OW}$ and ≤98% $t_{OW}$, such as ≥55% $t_{OW}$ and ≤95% $t_{OW}$, ≥55% $t_{OW}$ and ≤90% $t_{OW}$, ≥55% $t_{OW}$ and ≤85% $t_{OW}$, or ≥55% $t_{OW}$ and ≤80% $t_{OW}$. In still another aspect, $t_{OF}$ can be ≥60% $t_{OW}$ and ≤98% $t_{OW}$, such as ≥60% $t_{OW}$ and ≤95% $t_{OW}$, ≥60% $t_{OW}$ and ≤90% $t_{OW}$, ≥60% $t_{OW}$ and ≤85% $t_{OW}$, or ≥60% $t_{OW}$ and ≤80% $t_{OW}$.

Returning to FIG. 3, the arcuate sidewall 302 can include an unformed portion 320. At least one projection 322 can be formed in the arcuate sidewall 302 and can extend from the arcuate sidewall 302. Each of the at least one projection 322 can be surrounded by the unformed portion 320 of the arcuate sidewall 302. The at least one projection 322 can extend radially inward, radially outward, or both radially inward and radially outward with respect to the central axis 314 of the tolerance ring 122. The at least one projection 322 can be adapted to contact an inner surface of an outer component or an outer surface of an inner component.

In certain embodiments that include flange portions 308, 310 and projections 322 that extend in an inward direction relative to the central axis 314, $t_{OW}$ can be measured between an outer surface of the arcuate sidewall 302 of the tolerance ring panel 302 and an inner surface of a wall structure formed in the arcuate sidewall 302 of the tolerance ring panel 302. Further, in such embodiments, $t_{OF}$ is measured between the outer surface of the arcuate sidewall 302 of the tolerance ring panel 302 and the inner edge of the flange portion 308, 310.

The at least one projection 322 formed in each arcuate sidewall 302 can include a single elongated wave structure or a wave column that includes two or more wave structures vertically aligned with each other along the arcuate sidewall 302 of the tolerance ring panel 300, along a length of the tolerance ring panel 300.

As illustrated in FIG. 3, the at least one projection 322 can include a wave column 330 that can a first wave 332 near the top 306 of the arcuate sidewall 302 of the tolerance ring panel 300 and a second wave 334 near the bottom 308 of the arcuate sidewall 304 of the tolerance ring panel 300. In a particular aspect, the first wave 332 can be centered within the top half of the length of the tolerance ring panel 300. Moreover, the second wave 334 can be centered within the bottom half of the length of the tolerance ring panel 300.

Figure 4:
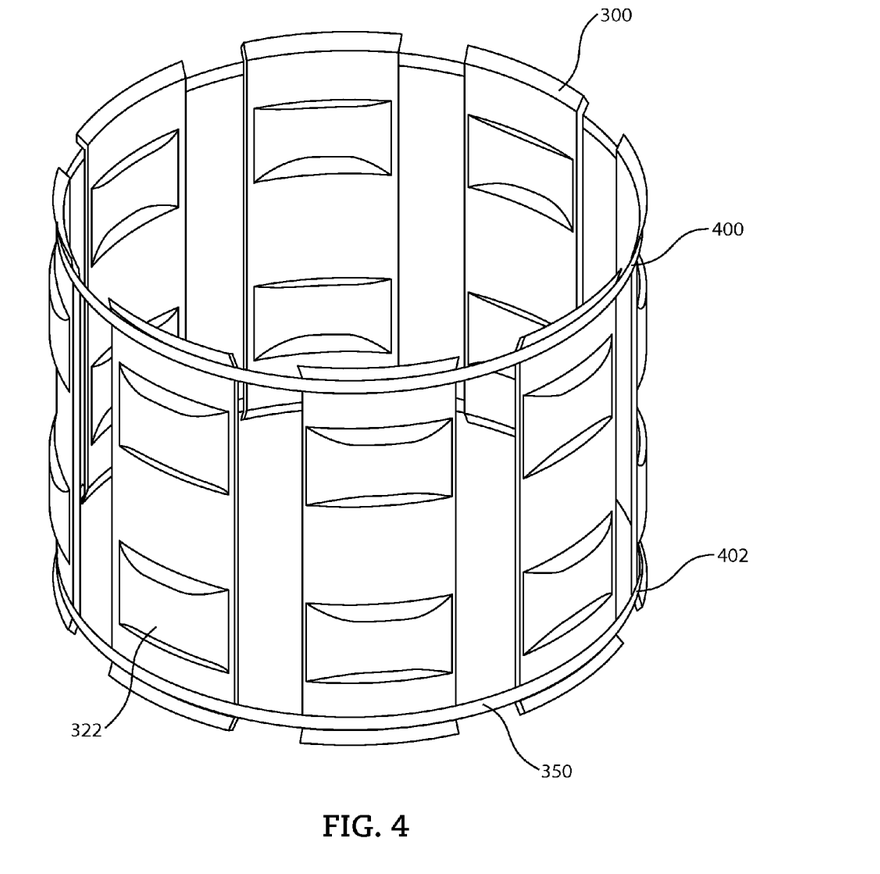
FIG. 4 includes a perspective view of a tolerance ring in accordance with another embodiment.

FIG. 4 through FIG. 8 indicate that the tolerance ring 122 can further include a support structure 350 that can be secured to the tolerance ring panels 300 in order to maintain the tolerance ring panels 300 position relative to each other. FIG. 4 shows that the support structure 350 can include a first ring 400 affixed to a top of each tolerance ring panel 300 and a second ring 402 affixed to a bottom of each tolerance ring panel 300. The rings 400, 402 include an inner periphery and the tolerance ring panels 300 can be affixed to the inner periphery of the rings 400, 402. In alternative embodiment, the projections 322 on the tolerance ring panels 300 can extend radially inward and the tolerance ring panels 300 can be affixed to an outer periphery of the first and second rings 400, 402. In another aspect, tolerance ring panels 300 can be affixed to the inner periphery and the outer periphery of the rings 400, 402. In such a case, the tolerance ring panels 300 can include a combination of panels having inwardly directed projections and panels having outwardly directed projections.

Moreover, the support structure 350 can include a single ring affixed to a top of each tolerance ring panel 300, a bottom of each tolerance ring panel 300, a midpoint of each tolerance ring panel 300 or some other location on the tolerance ring panel 300 between the top and bottom.

Figure 5:
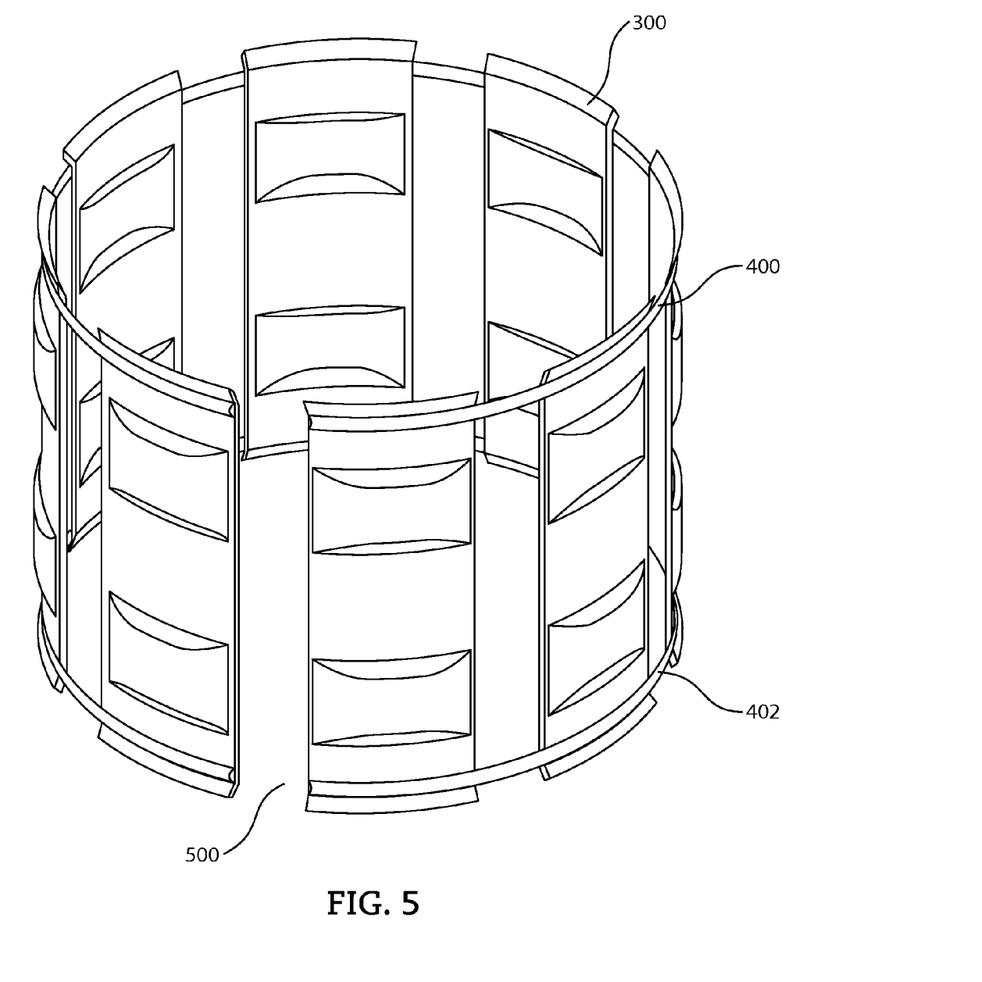
FIG. 5 includes a perspective view of a tolerance ring in accordance with yet another embodiment.

In a particular aspect, as illustrated in FIG. 5, each ring 400, 402 can include a gap 500 that can extend completely through the ring 400, 402 to form a split ring. Further, each ring 400, 402 can be deformable. In addition, each ring 400, 402 can be removably engaged with the tolerance ring panels 300 so that after installation of the tolerance ring panels 300 between and inner component and an outer component, the rings 400, 402 can be removed from the tolerance rings panels 300.

In another aspect, each ring 400, 402 can have a cross-sectional diameter, D, and each arcuate panel has a thickness measured through the unformed portion, T. In this aspect, D can be ≥50% T, such as 60% T, or 70% T. Moreover, D can be ≤300% T, such as ≤250% T, ≤200% T, ≤150% T, or ≤100% T. In another aspect, D can be within a range between and including any of the maximum and minimum values of D described herein.

For example, D can be ≥50% T and ≤300% T, such as ≥50% T and ≤250% T, ≥50% T and ≤200% T, ≥50% T and ≤150% T, or ≥50% T and ≤100% T. D can be ≥60% T and ≤300% T, such as ≥60% T and ≤250% T, ≥60% T and ≤200% T, ≥60% T and ≤150% T, or ≥60% T and ≤100% T. Further, D can be ≥70% T and ≤300% T, such as ≥70% T and ≤250% T, ≥70% T and ≤200% T, ≥70% T and ≤150% T, or ≥70% T and ≤100% T.

Figure 6:
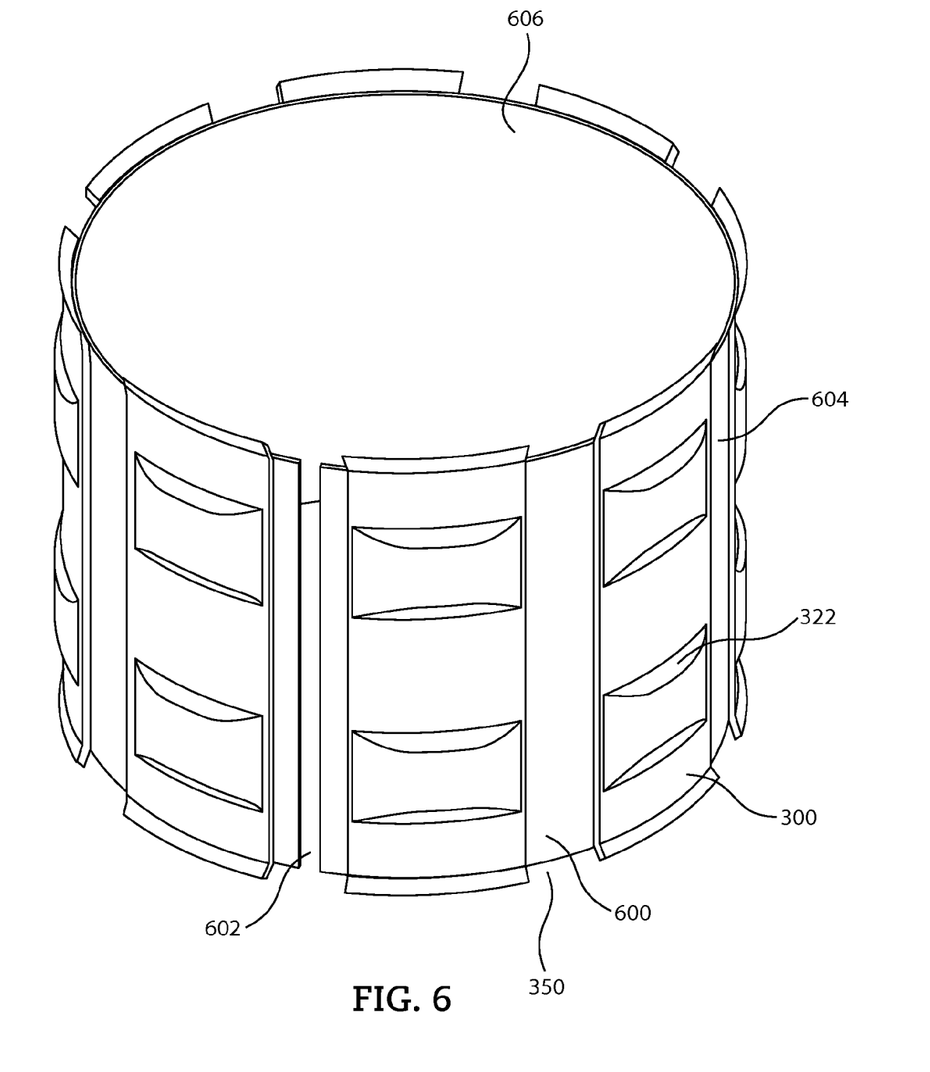
FIG. 6 includes a perspective view of a tolerance ring in accordance with still another embodiment.

In another aspect, as illustrated in FIG. 6, the support structure 350 can include a hollow, thin-walled cylinder 600. The cylinder 600 can be continuous or the cylinder 600 can include a slot, or gap 602, formed therein so that the cylinder 600 is completely split along the height of the cylinder 600. As indicated in FIG. 6, the cylinder 600 can include an outer surface 604. The tolerance ring panels 300, having outwardly directed projections 322, can be affixed to the outer surface 602 of the cylinder. In another aspect, the cylinder 600 can include an inner surface 606 and the tolerance ring panels 300, having inwardly directed projections can be affixed to the inner surface 604 of the cylinder.

The cylinder 600 can include a film, a metallized film, or a foil. Moreover, the cylinder 600 can be soluble, e.g., in water, acetone, or some other appropriate solvent. Accordingly, after the tolerance ring 300 is installed between and an inner component and an outer component, the assembly can be immersed or bathed in the solvent to remove the cylinder. In another aspect, the cylinder 600 can be elastic or flexible. In such a case, the cylinder 600 can expand to fit around shafts having varying sizes within a range of tolerances. At least a portion of the inner surface 606 or the outer surface 604 of the cylinder 600 can be coated with an adhesive and the tolerance ring panels 300 can be fixed to the cylinder 600 via the adhesive. In another aspect, the adhesive can be soluble so that the cylinder can be removed from the tolerance ring 300 after installation.

In a particular aspect, the cylinder 600 can include a sidewall thickness, $T_C$, and each arcuate panel can have a thickness, T, measured through the unformed portion 320 of the tolerance ring panel. In this aspect, $T_C$ can be ≤100% T, such as ≤75% T, ≤50% T, or ≤25% T. $T_C$ can be ≥1% T, such as ≥2.5% T, or ≥5% T. Moreover, $T_C$ can be within a range between and including any of the values of $T_C$ described herein.

For example, $T_C$ can be ≤100% T and ≥1% T, such as ≤100% T and ≥2.5% T, or ≤100% T and ≥5% T. Further, $T_C$ can be ≤75% T and ≥1% T, such as ≤75% T and ≥2.5% T, or ≤75% T and ≥5% T. Still further, $T_C$ can be ≤50% T and ≥1% T, such as ≤50% T and ≥2.5% T, or ≤50% T and ≥5% T. Even further, $T_C$ can be ≤25% T and ≥1% T, such as ≤25% T and ≥2.5% T, or ≤25% T and ≥5% T.

Figure 7:
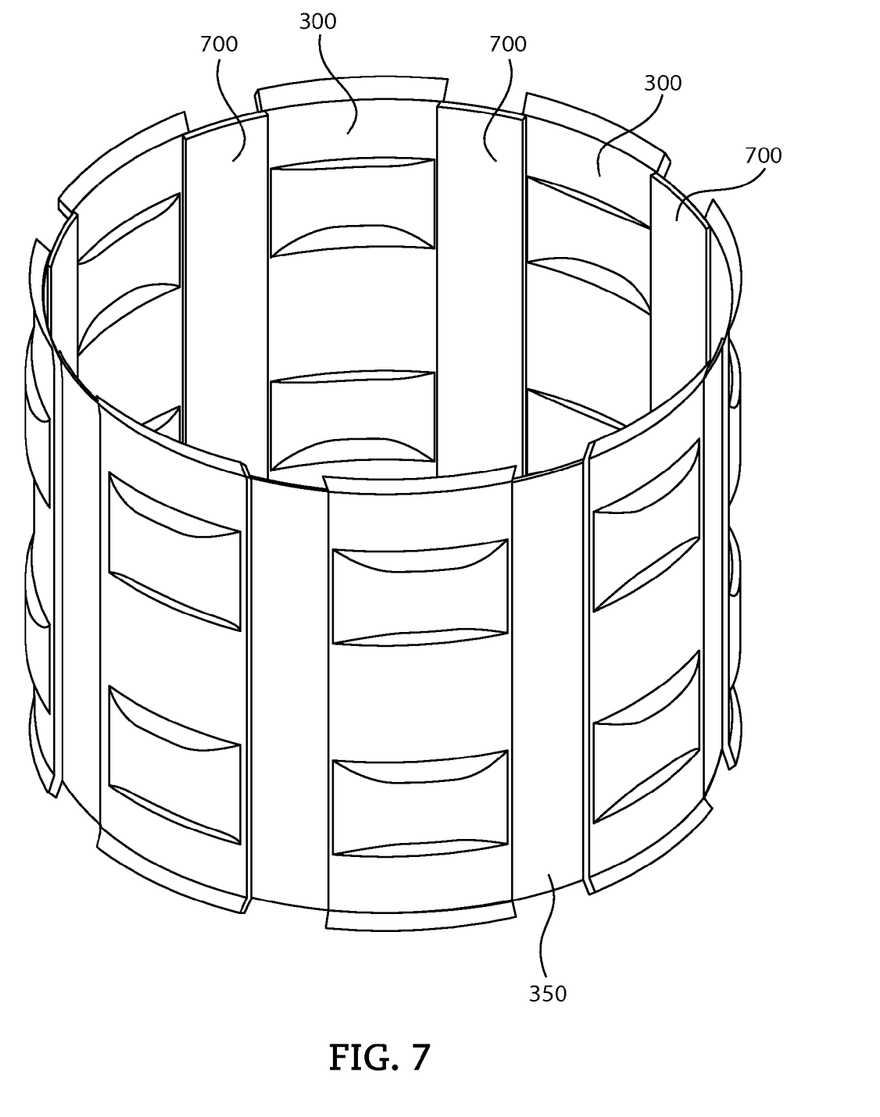
FIG. 7 includes a perspective view of a tolerance ring in accordance with yet still another embodiment.
Figure 8:
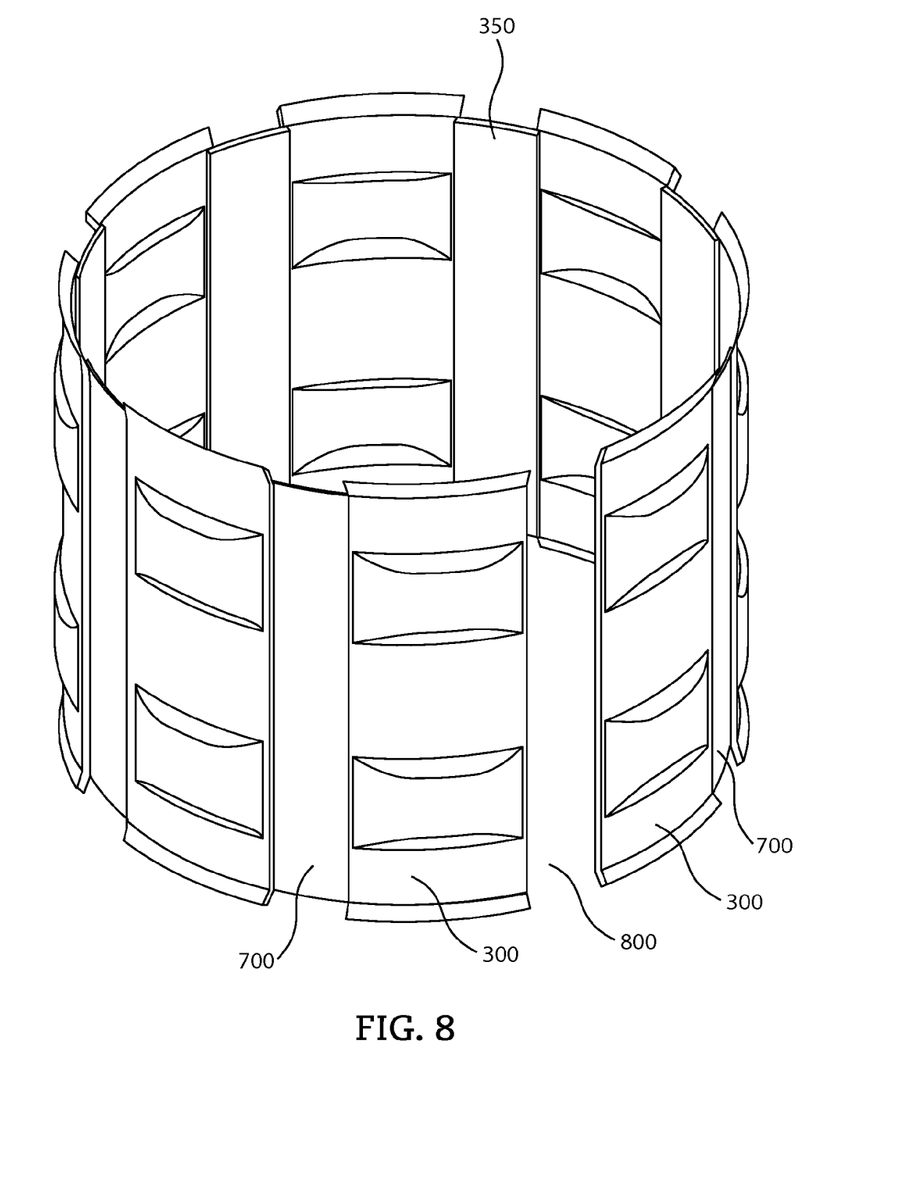
FIG. 8 includes a perspective view of a tolerance ring in accordance with still yet another embodiment.

Referring to FIG. 7 and FIG. 8, the support structure 350 can include a plurality of discrete support structures 700. Each discrete support structure 700 can be connected to two adjacent tolerance ring panels 300. In particular, each discrete support structure 700 can be attached to the adjacent tolerance ring panels 300 along an edge of each tolerance ring panel 300. Further, each discrete support structure 700 can slightly overlap the edges of each adjacent tolerance ring panel 300, e.g., over the outer surfaces of the tolerance ring panels 300 or the inner surfaces of the tolerance ring panels 300.

In a particular aspect, as illustrated in FIG. 7 and FIG. 8, each discrete support structure 700 can include a portion of a hollow, thin-walled cylinder. Further, each discrete support structure 700 can include a film, a metallized film, or a foil. Moreover, each discrete support structure 700 can be elastic or flexible. In a particular aspect, as illustrated in FIG. 7, each adjacent pair of tolerance ring panels 300 can be connected to a discrete support structure 700. However, as depicted in FIG. 8, one discrete support structure 700 may be removed from the assembly, to establish a gap 800 between two adjacent tolerance ring panels 300.

In another aspect, each discrete support structure 700 can include a portion of a ring. Moreover, in still another aspect, each discrete support structure 700 can have a thickness that is greater than a wall thickness of the unformed portion 320 of the tolerance ring panel 300. In this aspect, each discrete support structure 700 can include an axial slot formed along a length of each edge of the discrete support structure 700 and an edge of each adjacent tolerance ring panel 300 can fit into a respective slot formed in the discrete support structure 700.

In each of the various aspects described herein, each support structure 350 can include a height, $H_{SS}$. Moreover, each tolerance ring panel 300 can include a height, $H_P$. In one aspect, $H_{SS}$ can be ≤$H_P$. For example, $H_{SS}$ can be ≤95% $H_P$, such as ≤75% $H_P$, ≤50% $H_P$, or ≤25% $H_P$. $H_{SS}$ can also be ≥1% $H_P$, such as ≥5% $H_P$, or ≥10% $H_P$. In this aspect, $H_{SS}$ can be within a range between and including any of the maximum or minimum values of $H_{SS}$.

For example, $H_{SS}$ can be ≤95% $H_P$ and ≥1% $H_P$, such as ≤95% $H_P$ and ≥5% $H_P$, or ≤95% $H_P$ and ≥10% $H_P$. Further, $H_{SS}$ can be ≤75% $H_P$ and ≥1% $H_P$, such as ≤75% $H_P$ and ≥5% $H_P$, or ≤75% $H_P$ and ≥10% $H_P$. Even further, $H_{SS}$ can be ≤50% $H_P$ and ≥1% $H_P$, such as ≤50% $H_P$ and ≥5% $H_P$, or ≤50% $H_P$ and ≥10% $H_P$. Further still, $H_{SS}$ can be ≤25% $H_P$ and ≥1% $H_P$, such as ≤25% $H_P$ and ≥5% $H_P$, or ≤25% $H_P$ and ≥10% $H_P$.

In another aspect, to facilitate removal of the support structure 350, $H_{SS}$ can be ≥$H_P$ so that a portion of the support structure 350 extends beyond a top of the tolerance ring panels 300. For example, $H_{SS}$ can be ≥105% $H_P$, such as ≥110% $H_P$, or ≥120% $H_P$. In this aspect, $H_{SS}$ can be ≤200% $H_P$, such as ≤175% $H_P$, or ≤150% $H_P$. $H_{SS}$ can be within a range between and including any of the maximum and minimum values described herein.

For example, $H_{SS}$ can be ≥105% $H_P$ and ≤200% $H_P$, such as ≥105% $H_P$ and ≤175% $H_P$, or ≥105% $H_P$ and ≤150% $H_P$. Moreover, $H_{SS}$ can be ≥110% $H_P$ and ≤200% $H_P$, such as ≥110% $H_P$ and ≤175% $H_P$, or ≥110% $H_P$ and ≤150% $H_P$. Also, $H_{SS}$ can be ≥120% $H_P$ and ≤200% $H_P$, such as ≥120% $H_P$ and ≤175% $H_P$, or ≥120% $H_P$ and ≤150% $H_P$.

In yet another aspect, the support structure 350 can be shorter than the tolerance ring panels 300 but installed in such a manner that a portion of the support structure 350 extends beyond a top or a bottom of the tolerance ring panels 300.

In a particular aspect, when the pivot assembly 104 is installed within the bore 116 of the actuator arm with the tolerance ring 122 disposed there between, the pivot 120 and the bore 116 can include a central axis that lies along, or nearly along, the central axis 314 of the tolerance ring 122. The tolerance ring 122 can provide an axial stiffness that can substantially resist rocking movement of the pivot 120 relative to the bore 116 and the actuator 102 in which the central axis of the pivot 120 rotates about an axis perpendicular to the central axis (a longitudinal axis) with respect to the central axis 314.

When left unconstrained, such rocking motion can cause the read/write heads 114 to contact a hard disk. This contact is undesired and can cause failure of a hard disk drive. In a particular aspect, the axial stiffness of the tolerance ring 122 does not vary too greatly when measured at various locations circumferentially around an assembly that includes the tolerance ring 122. For example, the axial stiffness, $AS_G$, of the tolerance ring 122 through the gap 312 can be measured in a first direction that passes through the gap 312 and a center 314 of the tolerance ring 122. The axial stiffness of the tolerance ring 122 perpendicular to the gap 312, $AS_{PG}$, can be measured in a second direction perpendicular to the first direction. $AS_G$ can be ≥90% $AS_{PG}$, such as ≥91% $AS_{PG}$, ≥92% $AS_{PG}$, ≥93% $AS_{PG}$, ≥94% $AS_{PG}$, or ≥95% $AS_{PG}$. Further, $A_{SG}$ can be ≤100% $AS_{PG}$, ≤99% $AS_{PG}$, ≤98% $AS_{PG}$, ≤97% $AS_{PG}$, or ≤96% $AS_{PG}$. Moreover, $AS_G$ can be within a range between, and including, any of the percentage values of $AS_{PG}$ disclosed above.

Additionally, the resonant frequency of the tolerance ring 122 does not vary greatly when measured at various locations circumferentially the assembly in which the tolerance ring 122 is installed. For example, the resonant frequency of the tolerance ring 122 through the gap 312, $RF_G$, can be measured in a first direction that passes through the gap 312 and the center 314 of the tolerance ring 122. The resonant frequency of the tolerance ring 122 perpendicular to the gap 312, $RF_{PG}$, can be measured in a second direction perpendicular to the first direction. $RF_G$ can be ≥90% $RF_{PG}$, such as ≥91% $RF_{PG}$, ≥92% $RF_{PG}$, ≥93% $RF_{PG}$, ≥94% $RF_{PG}$, or ≥95% $RF_{PG}$. Further, $RF_G$ can be ≤100% $RF_{PG}$, ≤99% $RF_{PG}$, ≤98% $RF_{PG}$, ≤97% $RF_{PG}$, or ≤96% $RF_{PG}$. Moreover, $RF_G$ can be within a range between, and including, any of the percentage values of $RF_{PG}$ disclosed above.

While FIG. 2 and FIG. 3 indicate that the tolerance ring 122 can include one wave bank 330, and one unformed section 320. In other aspects, the tolerance ring 122 can include two wave banks and two unformed sections, three wave banks and three unformed sections, four wave banks and four undeformed sections, five wave banks and five unformed sections, six wave banks and six unformed sections, etc. Further, while each wave bank includes three wave structures, in other aspects each wave bank can include one wave structure, two wave structures, four wave structures, five wave structures, six wave structures, etc.

In a particular aspect, the tolerance ring, e.g. any of the tolerance rings disclosed herein, can provide a concentricity, C, that is measured as a distance between a center of an inner component and a center of an outer component after assembly as described herein. C can be ≤50 μm, such as ≤45 μm, ≤40 μm, ≤35 μm, ≤30 μm, ≤25 μm, or ≤20 μm. Moreover, C can be ≥1 μm, such as C≥5 μm, C≥10 μm, or C≥15 μm. Further, C can be within a range between, and including, any of the values of C described herein.

In a particular aspect, a tolerance ring according to any of the aspects described herein can be made from a metal, a metal alloy, or a combination thereof. The metal can include a ferrous metal. Further, the metal can include steel. The steel can include stainless steel, such as austenitic stainless steel. Moreover, the steel can include stainless steel comprising chrome, nickel, or a combination thereof. For example, the steel can X10CrNi18-8 stainless steel. Further, the tolerance ring can include a Vickers pyramid number hardness, VPN, which can be ≥350, such as ≥375, ≥400, or ≥425. VPN can also be ≤500, such as ≤475, or ≤450. VPN can also be within a range between, and including, any of the VPN values described herein.

For example, VPN can be ≥350 and ≤500, such as ≥350 and ≤475, or ≥350 and ≤450. VPN can be ≥375 and ≤500, such as ≥375 and ≤475, or ≥375 and ≤450. VPN can be ≥400 and ≤500, such as ≥400 and ≤475, or ≥400 and ≤450. Further, VPN can be ≥425 and ≤500, such as ≥425 and ≤475, or ≥425 and ≤450.

In another aspect, the tolerance ring can be treated to increase its corrosion resistance. In particular, the tolerance ring can be passivated. For example, the tolerance ring can be passivated according to the ASTM standard A967.

In another aspect, the stock material from which the tolerance ring can be formed can have a thickness, t, and t can be ≥0.075 mm, such as ≥0.080 mm, ≥0.085 mm, ≥0.087 mm, ≥0.090 mm, ≥0.095 mm, or ≥0.100 mm. In another aspect, t can be ≤0.115 mm, such as ≤0.113 mm, ≤0.110 mm, or ≤0.105 mm. Moreover, t can be within a range between, and including, any of the values of t disclosed above.

For example, t can be ≥0.075 mm and ≤0.115 mm, such as ≥0.075 mm and ≤0.113 mm, ≥0.075 mm and ≤0.110 mm, or ≥0.075 mm and ≤0.105 mm. In this aspect, t can be ≥0.080 mm and ≤0.115 mm, such as ≥0.080 mm and ≤0.113 mm, ≥0.080 mm and ≤0.110 mm, or ≥0.080 mm and ≤0.105 mm. Further, t can be ≥0.085 mm and ≤0.115 mm, such as ≥0.085 mm and ≤0.113 mm, ≥0.085 mm and ≤0.110 mm, or ≥0.085 mm and ≤0.105 mm. Moreover, t can be ≥0.087 mm and ≤0.115 mm, such as ≥0.087 mm and ≤0.113 mm, ≥0.087 mm and ≤0.110 mm, or ≥0.087 mm and ≤0.105 mm. Further still, t can be ≥0.090 mm and ≤0.115 mm, such as ≥0.090 mm and ≤0.113 mm, ≥0.090 mm and ≤0.110 mm, or ≥0.090 mm and ≤0.105 mm. Even further, t can be ≥0.095 mm and ≤0.115 mm, such as ≥0.095 mm and ≤0.113 mm, ≥0.095 mm and ≤0.110 mm, or ≥0.095 mm and ≤0.105 mm. Additionally, t can be ≥0.1 mm and ≤0.115 mm, such as ≥0.1 mm and ≤0.113 mm, ≥0.1 mm and ≤0.110 mm, or ≥0.1 mm and ≤0.105 mm.

The tolerance ring according to any of the aspects described herein may have an overall outer diameter, OD, and OD can be ≥5 mm, such as ≥6 mm, ≥7 mm, ≥8 mm, or ≥9 mm. The OD can be ≤20 mm, such as ≤15 mm, ≤14 mm, ≤13 mm, ≤12 mm, or ≤10 mm. Further, OD can be within a range between and including any of the values of OD described herein.

For example, OD can be ≥5 mm and ≤20 mm, such as ≥5 mm and ≤15 mm, ≥5 mm and ≤14 mm, ≥5 mm and ≤13 mm, ≥5 mm and ≤12 mm, or ≥5 mm and ≤10 mm. OD can be ≥6 mm and ≤20 mm, such as ≥6 mm and ≤15 mm, ≥6 mm and ≤14 mm, ≥6 mm and ≤13 mm, ≥6 mm and ≤12 mm, or ≥6 mm and ≤10 mm. OD can also be ≥7 mm and ≤20 mm, such as ≥7 mm and ≤15 mm, ≥7 mm and ≤14 mm, ≥7 mm and ≤13 mm, ≥7 mm and ≤12 mm, or ≥7 mm and ≤10 mm. Further, OD can be ≥8 mm and ≤20 mm, such as ≥8 mm and ≤15 mm, ≥8 mm and ≤14 mm, ≥8 mm and ≤13 mm, ≥8 mm and ≤12 mm, or ≥8 mm and ≤10 mm. OD can be ≥9 mm and ≤20 mm, such as ≥9 mm and ≤15 mm, ≥9 mm and ≤14 mm, ≥9 mm and ≤13 mm, ≥9 mm and ≤12 mm, or ≥9 mm and ≤10 mm.

In another aspect, the tolerance ring can have an overall length, L, and L can be ≤20 mm, such as ≤17 mm, ≤15 mm, ≤14 mm, or ≤13 mm. L can be ≥5 mm, such as ≥6 mm, ≥7 mm, ≥8 mm, ≥9 mm, or ≥10 mm. Moreover, L can be within a range between, and including, any of the values of L described above.

For example, L can be ≤20 mm and ≥5 mm, such as ≤20 mm and ≥6 mm, ≤20 mm and ≥7 mm, ≤20 mm and ≥8 mm, ≤20 mm and ≥9 mm, or ≤20 mm and ≥10 mm. L can be ≤17 mm and ≥5 mm, such as ≤17 mm and ≥6 mm, ≤17 mm and ≥7 mm, ≤17 mm and ≥8 mm, ≤17 mm and ≥9 mm, or ≤17 mm and ≥10 mm. L can be ≤15 mm and ≥5 mm, such as ≤15 mm and ≥6 mm, ≤15 mm and ≥7 mm, ≤15 mm and ≥8 mm, ≤15 mm and ≥9 mm, or ≤15 mm and ≥10 mm. L can be ≤14 mm and ≥5 mm, such as ≤14 mm and ≥6 mm, ≤14 mm and ≥7 mm, ≤14 mm and ≥8 mm, ≤14 mm and ≥9 mm, or ≤14 mm and ≥10 mm. Moreover, L can be ≤13 mm and ≥5 mm, such as ≤13 mm and ≥6 mm, ≤13 mm and ≥7 mm, ≤13 mm and ≥8 mm, ≤13 mm and ≥9 mm, or ≤13 mm and ≥10 mm.

Additionally, after the stock material used to form the tolerance ring panels, described herein, is cut, stamped, and rolled to form the tolerance ring, the resulting tolerance ring panels are substantially free of any burrs. Specifically, no burrs are visible along any of the cut edges under a visual inspection of the tolerance ring under 10× magnification.

EXAMPLE

A tolerance ring is manufactured from X10CrNi18-8 stainless steel stock. The stainless steel stock has a thickness of 0.1 mm±0.013. Further, the stainless steel stock has a VPN of 400-450 and is passivated to ASTM A967. The formed tolerance ring includes eight tolerance ring panels having two projections extending radially outward formed in each tolerance ring panel. The tolerance ring panels are equally spaced around the tolerance ring. Moreover, the projections are vertically aligned.

The tolerance ring is installed around a post and this assembly is installed within a ring. This assembly is suspended using fishing line and two lasers are placed perpendicular to a flat face of the ring on the same side of the ring. The lasers are placed 180 degrees from each other. One laser is used as a reference laser and the other laser is used as a measurement laser. The ring is tapped under the measurement laser using a hammer that has a force transducer incorporated therein. The lasers and the force transducer of the hammer are coupled to a microprocessor and provide inputs to the microprocessor.

The microprocessor includes software that calculates resonant frequencies from the inputs provided by the hammer and the lasers. The resonant frequency is directly related to the axial stiffness of the tolerance ring. The resonant frequency measured along an axis that bisects two opposite gaps and passes through a center of the assembly is nearly equal to the resonant frequency measured along an axis perpendicular to the first axis through a second pair of opposite gaps. As such, the axial stiffness through the first pair of opposite gaps is essentially the same as the axial stiffness through the second pair of opposite gaps perpendicular to the first pair.

The tolerance ring described herein provides a tolerance ring panel arrangement having very little, if any, panel-to-panel force interaction. These discrete panels are essentially isolated from each other and can provide a resonant frequency and stiffness that do not substantially vary circumferentially around the tolerance ring. As such, the tolerance ring can maintain the post in alignment within the bore and can substantially prevent any rocking of the post within the bore under normal operational loads in nearly any radial direction.

A skilled artisan can recognize that there may be others applications that can utilize a tolerance ring having one or more of the characteristics described herein.

Item 1. A tolerance ring comprising:
a plurality of discrete tolerance ring panels wherein each tolerance ring panel comprises an arcuate sidewall having an unformed portion and at least one projection extending from the arcuate sidewall, wherein the projection is surrounded by the unformed portion of the arcuate sidewall and wherein the tolerance ring is configured to be deployed in an interference fit between an inner component and an outer component to provide torque coupling between an inner component and an outer component.

Item 2. An assembly, comprising:
an inner component;
an outer component installed around the inner component; and
a tolerance ring installed between the inner component and the outer component, wherein the tolerance ring comprises:
a plurality of discrete tolerance ring panels wherein each tolerance ring panel comprises an arcuate sidewall having an unformed portion and at least one projection extending from the arcuate sidewall, wherein the projection is surrounded by the unformed portion of the arcuate sidewall and wherein the tolerance ring is deployed in an interference fit between the inner component and the outer component to provide torque coupling between the inner component and the outer component.

Item 3. A hard disk drive assembly, comprising:
an actuator arm including a plurality of read/write heads installed thereon, the actuator arm including a bore;
a pivot assembly installed within the bore of the actuator arm; and
a tolerance ring installed within the bore around the pivot assembly, the tolerance ring comprising:
a plurality of discrete tolerance ring panels wherein each tolerance ring panel comprises an arcuate sidewall having an unformed portion and at least one projection extending from the arcuate sidewall, wherein the projection is surrounded by the unformed portion of the arcuate sidewall and wherein the tolerance ring is configured to be deployed in an interference fit between the pivot assembly and the actuator arm to provide torque coupling between the pivot assembly and the actuator arm.

Item 4. The tolerance ring or assembly according to any of items 1, 2, or 3, wherein the tolerance ring panels are spaced apart circumferentially to form a plurality of gaps within the tolerance ring.

Item 5. The tolerance ring or assembly according to item 4, wherein each gap has a circumferential width, $W_G$, and $W_G$ is uniform around the tolerance ring.

Item 6. The tolerance ring or assembly according to item 4, wherein each gap has a circumferential width, $W_G$, and $W_G$ varies around the tolerance ring.

Item 7. The tolerance ring or assembly according to item 4, wherein each gap has a circumferential width, $W_G$, and each panel has a circumferential width, $W_P$, and $W_G \leq 400\% \, W_P$, such as $\leq 300\% \, W_P$, $\leq 200\% \, W_P$, $\leq 100\% \, W_P$, or $\leq 50\% \, W_P$.

Item 8. The tolerance ring or assembly according to item 7, wherein $W_G \geq 1\% \, W_P$, such as $\geq 5\% \, W_P$, or $\geq 10\% \, W_P$.

Item 9. The tolerance ring or assembly according to any of items 1, 2, or 3, wherein each panel has a circumferential width, $W_P$, and $W_P$ is uniform around the tolerance ring.

Item 10. The tolerance ring or assembly according to any of items 1, 2, or 3, wherein each panel has a circumferential width, $W_P$, and $W_P$ varies around the tolerance ring.

Item 11. The tolerance ring or assembly according to any of items 1, 2, or 3, wherein the tolerance ring includes at least three discrete tolerance ring panels.

Item 12. The tolerance ring or assembly according to item 11, wherein the tolerance ring includes at least four discrete tolerance ring panels.

Item 13. The tolerance ring or assembly according to item 12, wherein the tolerance ring includes at least five discrete tolerance ring panels.

Item 14. The tolerance ring or assembly according to item 13, wherein the tolerance ring includes at least six discrete tolerance ring panels.

Item 15. The tolerance ring or assembly according to item 13, wherein the tolerance ring includes at least eight discrete tolerance ring panels.

Item 16. The tolerance ring or assembly according to item 15, wherein the tolerance ring includes no more than twenty discrete tolerance ring panels.

Item 17. The tolerance ring or assembly according to any of items 1, 2, or 3, further comprising a support structure secured to the panels in order to maintain the panels in position relative to each other.

Item 18. The tolerance ring or assembly according to item 17, wherein the support structure includes a height, $H_{SS}$, and each tolerance ring panel includes a height, $H_P$, and $H_{SS} \leq H_P$.

Item 19. The tolerance ring or assembly according to item 18, wherein $H_{SS} \leq 95\% \, H_P$, such as $\leq 75\% \, H_P$, $\leq 50\% \, H_P$, or $\leq 25\% \, H_P$.

Item 20. The tolerance ring or assembly according to item 19, wherein $H_{SS} \geq 1\% \, H_P$, such as $\geq 5\% \, H_P$, or $\geq 10\% \, H_P$.

Item 21. The tolerance ring or assembly according to item 17, wherein the support structure comprises a ring.

Item 22. The tolerance ring or assembly according to item 21, wherein the ring includes a gap extending completely through the ring to form a split ring.

Item 23. The tolerance ring or assembly according to item 21, wherein the ring is deformable.

Item 24. The tolerance ring or assembly according to item 21, wherein the ring has a cross-sectional diameter, D, and each arcuate panel has a thickness measured through the unformed portion, T, and $D \geq 50\% \, T$, such as $60\% \, T$, or $70\% \, T$.

Item 25. The tolerance ring or assembly according to item 24, wherein $D \leq 300\% \, T$, such as $\leq 250\% \, T$, $\leq 200\% \, T$, $\leq 150\% \, T$, or $\leq 100\% \, T$.

Item 26. The tolerance ring or assembly according to item 21, wherein the ring includes an inner periphery and an outer periphery and the tolerance ring panels are affixed to the inner periphery, the outer periphery, or the inner periphery and the outer periphery.

Item 27. The tolerance ring or assembly according to item 21, wherein the ring is removably engaged with the tolerance ring panels.

Item 28. The tolerance ring or assembly according to item 17, wherein the support structure comprises a hollow, thin-walled cylinder.

Item 29. The tolerance ring or assembly according to item 28, wherein the cylinder includes an inner surface and the tolerance ring panels are affixed to the inner surface of the cylinder.

Item 30. The tolerance ring or assembly according to item 28, wherein the cylinder includes an outer surface and the tolerance ring panels are affixed to the outer surface of the cylinder.

Item 31. The tolerance ring or assembly according to item 28, wherein the cylinder includes a thickness, $T_F$, and each arcuate panel has a thickness measured through the unformed portion, T, and $T_F \geq 100\%$ T, such as $\leq 75\%$ T, $\leq 50\%$ T, or $\leq 25\%$ T.

Item 32. The tolerance ring or assembly according to item 31, wherein $T_F \geq 1\%$ T, such as $\geq 2.5\%$ T, or $\geq 5\%$ T.

Item 33. The tolerance ring or assembly according to item 28, wherein the cylinder comprises a film, a metallized film, or a foil.

Item 34. The tolerance ring or assembly according to item 28, wherein the cylinder is soluble.

Item 35. The tolerance ring or assembly according to item 28, wherein the cylinder is elastic.

Item 36. The tolerance ring or assembly according to item 28, wherein the cylinder is flexible.

Item 37. The tolerance ring or assembly according to any of items 1, 2, or 3, wherein the projections extend radially inward, radially outward, or radially inwardly and radially outwardly from the arcuate sidewall of each panel.

Item 38. The tolerance ring or assembly according to any of items 1, 2, or 3, wherein the projections are adapted to contact an inner surface of an outer component or an outer surface of an inner component.

Item 39. The tolerance ring or assembly according to item 17, wherein the support structure comprises a plurality of discrete support structures and each discrete support structure is connected to two adjacent tolerance ring panels.

Item 40. The tolerance ring or assembly according to item 39, wherein each discrete support structure includes a portion of a ring.

Item 41. The tolerance ring or assembly according to item 39, wherein each discrete support structure comprises a portion of a hollow, thin-walled cylinder.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A tolerance ring comprising: a plurality of discrete tolerance ring panels, wherein each tolerance ring panel comprises an arcuate sidewall having an unformed portion and at least one projection extending from the unformed portion, wherein the at least one projection is surrounded by the unformed portion of the arcuate sidewall, wherein at least one of the tolerance ring panels is spaced apart circumferentially from adjacent tolerance ring panels by a gap on a first circumferential side of the at least one tolerance ring panel and a gap on a second circumferential side of the at least one tolerance ring panel, wherein the gaps extend along an entire axial length of the tolerance ring, and wherein the tolerance ring is configured to be deployed in an interference fit between an inner component and an outer component to provide torque coupling therebetween.

2. The tolerance ring according to claim 1, wherein all tolerance ring panels are spaced apart circumferentially from adjacent tolerance ring panels by gaps extending along the entire axial length of the tolerance ring.

3. The tolerance ring according to claim 1, further comprising a support structure secured to the tolerance ring panels in order to maintain the tolerance ring panels in position relative to each other.

4. The tolerance ring according to claim 3, wherein the support structure includes a height, $H_{SS}$, and each tolerance ring panel includes a height, $H_P$, and $H_{SS} \leq H_P$.

5. The tolerance ring according to claim 3, wherein the support structure comprises a ring.

6. The tolerance ring according to claim 5, wherein the ring includes a gap extending completely through the ring to form a split ring.

7. The tolerance ring according to claim 5, wherein the ring includes an inner periphery and an outer periphery and the tolerance ring panels are affixed to the inner periphery, the outer periphery, or the inner periphery and the outer periphery.

8. The tolerance ring according to claim 5, wherein the ring is removably engaged with the tolerance ring panels.

9. The tolerance ring according to claim 3, wherein the support structure comprises a hollow, thin-walled cylinder.

10. The tolerance ring according to claim 9, wherein the cylinder includes an inner surface and the tolerance ring panels are affixed to the inner surface of the cylinder.

11. The tolerance ring according to claim 9, wherein the cylinder includes an outer surface and the tolerance ring panels are affixed to the outer surface of the cylinder.

12. The tolerance ring according to claim 9, wherein the cylinder comprises a film, a metallized film, or a foil.

13. The tolerance ring according to claim 9, wherein the cylinder is soluble.

14. The tolerance ring according to claim 9, wherein the cylinder is elastic.

15. The tolerance ring according to claim 9, wherein the cylinder is flexible.

16. An assembly, comprising:
an inner component;
an outer component installed around the inner component; and
a tolerance ring installed between the inner component and the outer component, wherein the tolerance ring comprises:
a plurality of discrete tolerance ring panels, wherein each tolerance ring panel comprises an arcuate sidewall having an unformed portion and at least one projection extending from the unformed portion, wherein the at least one projection is surrounded by the unformed portion of the arcuate sidewall, wherein all tolerance ring panels are spaced apart circumferentially from adjacent tolerance ring panels by gaps extending along the entire axial length of the tolerance ring, and wherein the tolerance ring is deployed in an interference fit between the inner component and the outer component to provide torque coupling therebetween.

17. A hard disk drive assembly, comprising:
an actuator arm including a plurality of read/write heads installed thereon, the actuator arm including a bore;
a pivot assembly installed within the bore of the actuator arm; and a tolerance ring installed within the bore around the pivot assembly, the tolerance ring comprising:
a plurality of discrete tolerance ring panels, wherein each tolerance ring panel comprises an arcuate sidewall having an unformed portion and at least one projection extending from the arcuate sidewall, wherein the at least one projection is surrounded by the unformed portion of the arcuate sidewall, wherein at least one of the tolerance ring panels is disconnected from adjacent tolerance ring panels by gaps extending along an entire axial length of the tolerance ring, and wherein the tolerance ring is configured to be deployed in an interference fit between the pivot assembly and the actuator arm to provide torque coupling therebetween.

18. The assembly according to claim 16, further comprising a support structure secured to the tolerance ring panels in order to maintain the tolerance ring panels in position relative to each other.

19. The hard disk drive assembly according to claim 17, further comprising a support structure secured to the tolerance ring panels in order to maintain the tolerance ring panels in position relative to each other.

20. The hard disk drive assembly according to claim 19, wherein the support structure is removably engaged with the tolerance ring panels.

\* \* \* \* \*